UNITED STATES PATENT OFFICE.

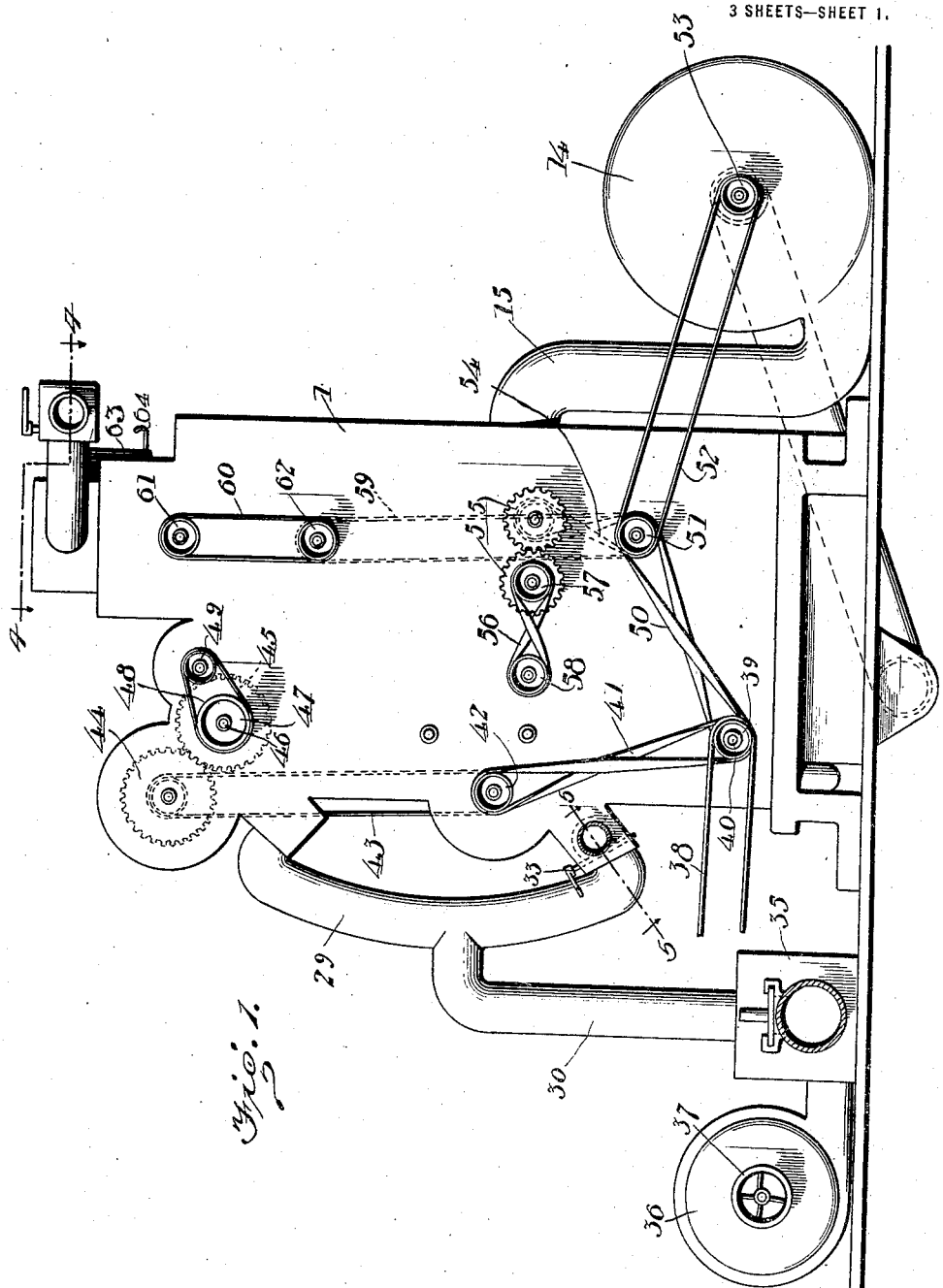

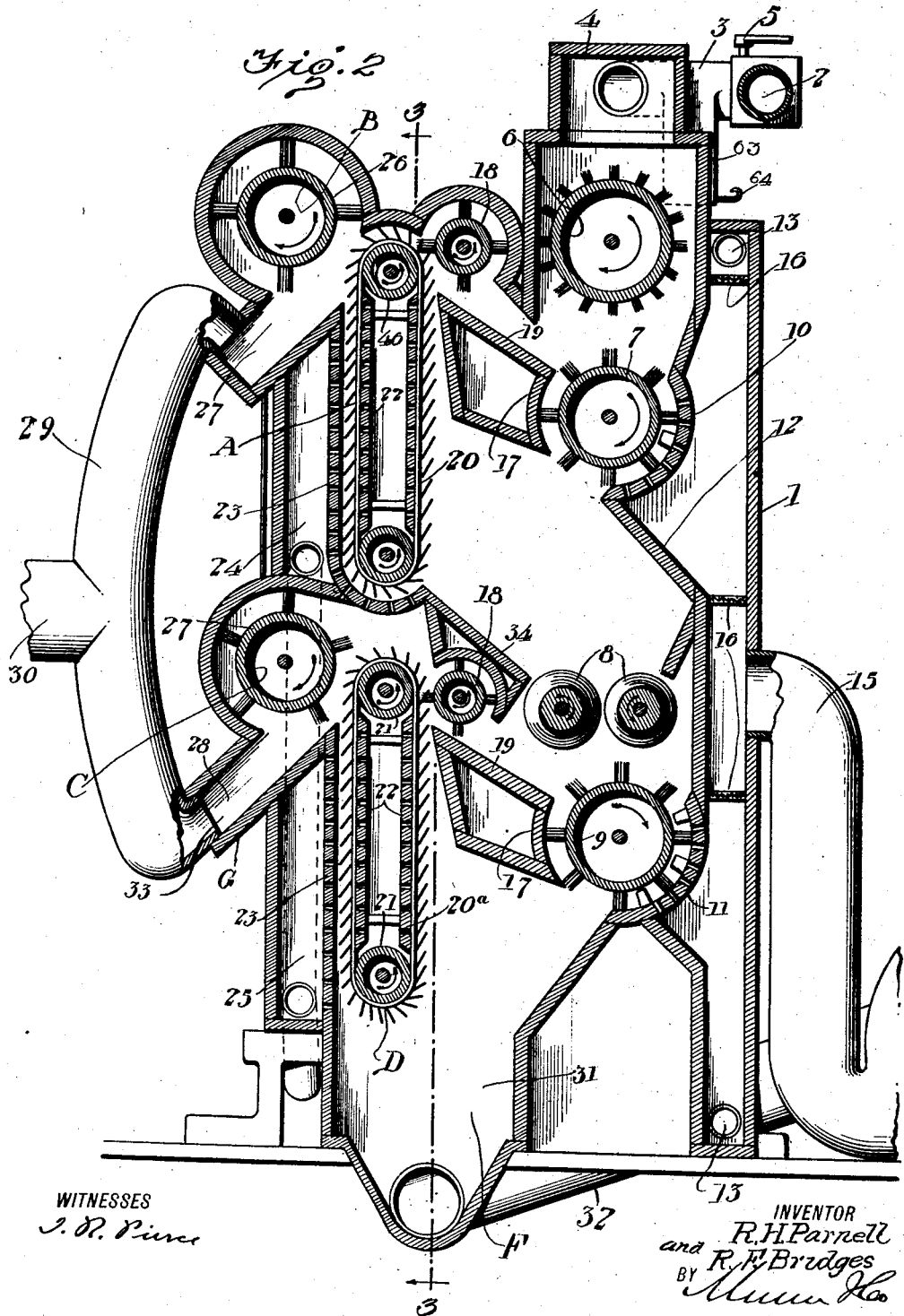

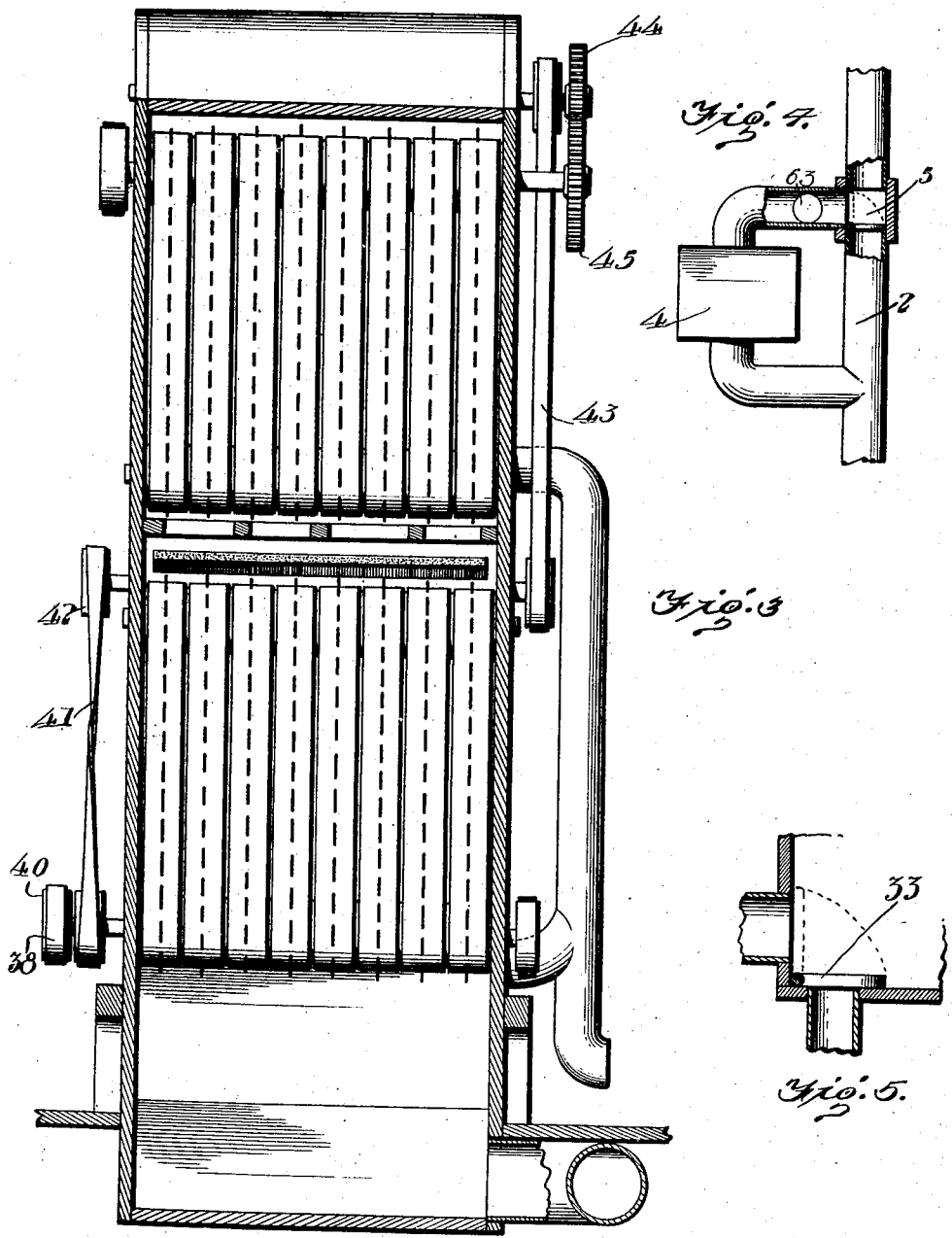

RICHARD H. PURNELL AND ROBERT F. BRIDGES, OF MEMPHIS, TENNESSEE.

BOLL-COTTON SEPARATOR AND CLEANER.

1,304,804. Specification of Letters Patent. Patented May 27, 1919.

Application filed August 22, 1918. Serial No. 250,989.

*To all whom it may concern:*

Be it known that we, RICHARD H. PURNELL and ROBERT F. BRIDGES, both citizens of the United States, and residents of Memphis, in the county of Shelby and State of Tennessee, have invented certain new and useful Improvements in Boll-Cotton Separators and Cleaners, of which the following is a specification.

Our invention is an improvement in boll cotton separators, and has for its object to provide a device of the character specified, especially adapted for producing two separate grades of cotton from the one machine or for mixing the two grades in the machine.

In the drawings:

Figure 1 is a side view of the improved separator,

Fig. 2 is a longitudinal vertical section,

Fig. 3 is a section on the line 3—3 of Fig. 2, looking in the direction of the arrows adjacent to the line, and Figs. 4 and 5 are sections on the line 4—4 and 5—5, respectively, of Fig. 1, each view looking in the direction of the arrows adjacent to the line.

In the present embodiment of the invention, a casing 1 is provided of substantially rectangular cross section, and this casing has an inlet for the cotton at its top, and an outlet for the hulls and trash at its bottom.

The inlet 2 which is the main suction pipe for feeding the cotton from the wagon or warehouse to the separator has branches 3 delivering to opposite sides of an extension 4 of the casing.

A valve 5 is interposed in the feed pipe or inlet 2 at one of these branches, and it will be obvious that when the valve is closed, the inlet may feed from the pipe 2 to the extension casing 4. Directly below the open bottom of this extension 4 is arranged a cylindrical brush 6 which feeds the cotton from the extension 4 to the cleaning cylinder 7 which is arranged directly below the feeding brush 6.

The brush 7 delivers the cotton between a pair of crushing rollers 8, the said rollers being concave as shown and adapted to mash the bolls as they are passed between them.

A third cylinder brush or cylinder 9 is journaled below the cylinder 7, and the concave rollers 8 feed to this cylinder 9. It will be noticed referring to Fig. 2, that the cylinders, 6, 7, and 9 have their axes in the same vertical plane. Screens 10 and 11 coöperate with the brushes or cylinders 7 and 9, the said screens being arranged at the outer side and below the said brushes, the bristles of the brushes moving in contact with the faces of the screen which are in fact concaves. Each concave has teeth for coöperating with the bristles of the brushes to insure a thorough cleaning of the cotton.

The screens 10 and 11 are arranged in a vertical partition 12 which divides the front portion of the casing 1 from the body thereof, and the compartment formed between the partition 12, the screens 10 and 11, and the front wall of the casing is a species of wind trunk to which the dust cleaned from the cotton is delivered, and is afterward withdrawn.

A pipe 13 leads from the end of the wind trunk, and connects the same with the fan casing 14, and a third pipe 15 leads from about the center of the wind trunk to the said casing. A screen 16 is arranged below the pipe 13, and similar screens 16$^a$ are arranged on opposite sides of the opening of the pipe 15. Concaves 17 are arranged adjacent to the brushes 7 and 9, at points opposite the concaves 10 and 11, and both the concaves are toothed as shown.

Feeding brushes 18 and 18$^a$ of cylindrical form are journaled adjacent to the cleaning brushes 7 and 9. Each brush is slightly above and in rear of the adjacent brush 7 or 9, and inclines 19 and 19$^a$ lead from the respective cleaning brushes 7 and 9 to the feeding brushes 18 and 18$^a$, and these brushes 18 and 18$^a$ deliver to endless carriers.

Each of these carries 20 and 20$^a$ is composed of an endless belt having teeth as shown, and they are supported on rollers 21 journaled in the casing. Gratings 22 are arranged behind the respective runs of the belt, and it will be noticed that the teeth of both carriers are inclined, all being inclined in the same direction and in the direction in which the carrier is moved.

Behind each carrier is arranged a grating or perforated wall 23, the said walls being between the carriers and passages 24 and 25 respectively. Each carrier delivers to a feeding brush 26 and 27, respectively, the said brushes being cylindrical, and delivering by means of pipes 27 and 28 to a common pipe 29.

This common pipe 29 has a delivery 30 which may be connected with the gins or with a suitable place of storage. The inlet end 31 of a screw conveyor is arranged just above the inlet end of a pipe 32 which is the delivery pipe for the hulls, trash and the like.

A valve 33 is arranged in the pipe 28, just above the pipes 29 in order to shut off the supply of cotton from the cleaning brush 9 when desired.

The operation of the device is as follows:

The cotton enters the machine from the main suction pipe 2 which carries the cotton to the gins, passing into the hopper in which is arranged the cylindrical feeding brush 6. The cotton is thoroughly cleaned and separated from the trash by the brush 7, the better grade of cotton passing up the incline 19 to the feeding brush 18, which delivers it to the endless carrier 20. The carrier delivers this cotton to the brush 26 which in turn feeds it to the common pipe 29. The lower grade of cotton, namely, that which passes the brush 7, is passed between the rollers 8, which crush the imperfect bolls, and delivers the mass to the brush 9 which acts in the same manner as the brush 7, delivering the cotton to the incline 19ª, and the hulls, trash and the like to the pipe 32 and the conveyer 31. It will be understood that only the cotton sticks to the endless carrier 20, the hulls and imperfect bolls falling off the belt and passing down an incline 34 to the rollers 8. The same is true of the belt 20ª, the hulls, trash, and the like dropping down to the bottom of the casing. Finely comminuted matter substances pass through the gratings 10 and are carried away by the pipes 13. The pipe 30 leads to a wind trunk or casing 35, and a fan 36 is connected with this box for exhausting the air therefrom. The fans 14 and 36 draw the air through the machine in the manner indicated by the arrows, and it will be observed that the pipe 32 is connected with the fan casing 14.

Referring to Fig. 3, it will be noticed that each of the endless carriers or conveyers 20 and 20ª is composed of a series of belts, each belt having a series of teeth as shown.

The fan 36 is driven by means of a pulley 37 which may be connected with a suitable source of power. A driving belt 38 from the source of power engages a pulley 39 on the shaft 40 which carries the lowermost roller 21.

This shaft has a second pulley which is connected by a belt 41 with a pulley 42 on the cylindrical brush 27. At the opposite end from the pulley 42 the brush carries a pulley which is connected by a belt 43 with a pulley on the brush 26.

This brush carries a gear wheel 44 which meshes with the wheel 45 on the shaft of the roller 46 which supports the upper end of the carrier 20. This roller 46 has a pulley 47 which is connected by a belt 48 with a pulley 46 on the brush 18.

A third pulley on the shaft 40 is connected by a belt 50 with a pulley on the brush 9. This brush carries a second pulley 51 which is connected by a belt 52 with a pulley 53 on the fan 14. The rollers 8 are driven from the brush 9 as are also the brushes 6 and 7.

The front roller 8 is connected to a pulley on the roller 9 by means of a cross belt 54 indicated in dotted lines in Fig. 1. The rollers are geared together by gearing 55, and the rear roller is connected by a belt 56 with the brush 18ª, the belt engaging pulleys 57 and 58 on the roller 8 and on the brush 18, respectively.

The belt 59 connects the shaft 51 with the shaft of the brush 7, and a second belt 60 connects the shafts of the brushes 6 and 7, the said belt connecting pulleys 61 and 62, on the shaft.

Referring now to Figs. 4 and 5, it will be noted that the valves 5 and 33 which control the inlet of the cotton to the machine, and the outlet of the same therefrom are merely disks arranged in the pipes and capable of being swung into the open or closed position.

It will be noticed, referring to Figs. 1, 2 and 4 that means is provided for catching nails and like pieces of metal that may be in the cotton, before it is fed into the machine, and as it passes from the pipe 2 into the extensions 4. The said means is a casing 63 which depends from that branch 3 of the pipe 2 which is adjacent to the valve 5. This casing 63 has a valve 64 at its bottom for permitting the contents thereof to be removed, and it will be obvious that any heavy material such, for instance, as nails, pieces of bale wire and the like, that might be in the cotton will drop into this depending casing as they pass thereover, and may be afterward removed from the machine.

We claim:

1. A device of the character specified, comprising a casing having at its top an inlet for the cotton and at its bottom an outlet for the trash, a plurality of cleaning means within the casing arranged between the inlet and the outlet, one above the other, an endless conveyer in rear of each cleaner, each conveyer comprising a vertically moving endless belt having teeth or projections for engaging the cotton, each cleaning means delivering to the adjacent conveyer, said casing having an outlet adjacent to each conveyer, means between the conveyer and the outlet for feeding cotton thereto, a pair of crushing rollers below the first cleaning means to which the said means delivers, and means for creating a current of air through the casing to feed the cotton and remove the trash.

2. A device of the character specified, comprising a casing having at its top an inlet for the cotton and at its bottom an outlet for the trash, a plurality of cleaning means within the casing arranged between the inlet and the outlet, one above the other, an endless conveyer in rear of each cleaner, each conveyer comprising a vertically moving endless belt having teeth or projections for engaging the cotton, each cleaning means delivering to the adjacent conveyer, said casing having an outlet adjacent to each conveyer, means between the conveyer and the outlet for feeding cotton thereto.

3. A device of the character specified, comprising a plurality of means for working the cotton into a loose flocculent mass and arranged one above the other, means for separating the loose flocculent cotton from the bolls adjacent to each of said first named means, each of the last named means comprising a vertically movable carrier having spurs or lugs for engaging the cotton, the uppermost of the last named means feeding to the lowermost of the first named means.

RICHARD H. PURNELL.
ROBERT F. BRIDGES.

Witnesses:
P. C. CLARKE, Jr.,
Mrs. L. E. OWEN.

Copies of this patent may be obtained for five cents each, by addressing the "Commissioner of Patents, Washington, D. C."